(12) United States Patent  
Mankala et al.

(10) Patent No.: US 9,229,934 B2
(45) Date of Patent: Jan. 5, 2016

(54) METHOD AND SYSTEM FOR DOCUMENT INTEGRATION

(75) Inventors: Santosh Mankala, Fremont, CA (US);
Shuchun Yang, San Francisco, CA (US);
Scott Glaser, Dublin, CA (US);
Poonguzhali Balasubramanianf,
Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 536 days.

(21) Appl. No.: 13/233,468

(22) Filed: Sep. 15, 2011

(65) Prior Publication Data

US 2013/0018904 A1    Jan. 17, 2013

Related U.S. Application Data

(60) Provisional application No. 61/506,929, filed on Jul. 12, 2011.

(51) Int. Cl.
*G06F 17/30* (2006.01)
(52) U.S. Cl.
CPC .............................. *G06F 17/30011* (2013.01)
(58) Field of Classification Search
USPC ......................................................... 707/756
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |

(Continued)

*Primary Examiner* — Hosain Alam
*Assistant Examiner* — Tuan-Khanh Phan
(74) *Attorney, Agent, or Firm* — Dergosits & Noah LLP; Todd A. Noah

(57) ABSTRACT

A method for integrating a document from a first document repository to another document repository in a cloud computing environment is disclosed. The method embodiment includes receiving by a server a configuration setup file including information identifying a source document repository, a destination document repository located in a cloud computing environment, and at least one web portal. When an indication to upload a document from the source document repository to the destination document repository is received by the server, the server is configured to retrieve automatically the document from the source document repository, to convert automatically the document from a first format to a second format, and to transmit the converted document to the destination document repository, whereby the converted document is accessed via the at least one web portal.

21 Claims, 6 Drawing Sheets

(56) References Cited

U.S. PATENT DOCUMENTS

| | | |
|---|---|---|
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,401,094 B1 | 7/2008 | Kesler |
| 7,620,655 B2 | 11/2009 | Larsson |
| 7,698,160 B2 | 4/2010 | Beaven et al. |
| 8,010,663 B2 | 8/2011 | Firminger et al. |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0069081 A1* | 6/2002 | Ingram et al. ............. 705/1 |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0149791 A1* | 8/2003 | Kane et al. ............. 709/246 |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0024579 A1* | 2/2004 | Nusbickel et al. ............. 703/27 |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050099 A1* | 3/2005 | Bleistein et al. ............ 707/104.1 |
| 2005/0050555 A1 | 3/2005 | Exley et al. |
| 2005/0091098 A1 | 4/2005 | Brodersen et al. |
| 2006/0010175 A1* | 1/2006 | Kwong ............. 707/203 |
| 2009/0063415 A1 | 3/2009 | Chatfield et al. |
| 2009/0254610 A1* | 10/2009 | Arthursson ............. 709/203 |
| 2011/0145196 A1* | 6/2011 | Bender et al. ............. 707/640 |

* cited by examiner

| | | |
|---|---|---|
| Destination document repository | urlprefix | http://knowledge.salesforce.com/support |
| | hostname | knowledge.salesforce.com |
| | login | admin |
| | password | ●●●●●●●● |
| | JAVA_HOME | D:/ht-docs-integration/tools/win32/jdk/jdk1.6.0_14 |
| | ANT_HOME | D:/ht-docs-integration/tools/ant/apache-ant-1.7.1 |
| | mail.from | smankala@salesforce.com |
| | mail.to | smankala@salesforce.com |
| Web portal | endPointURL | https://www.salesforce.com/services/Soap/u/20.0 |
| | Prod.sfdcUserName | htapi@dreamevent.com |
| | Prod.sfdcPassword | ●●●●●●●●●●● |
| Source document repository | p4.docs.home | D:/ht-docs-integration |
| | p4.username | htdoc_api |
| | p4.password | ●●●●●●●●●●●●● |
| | p4.workspace | docs_integration_prod |
| | p4.port | p4proxy.soma.salesforce.com:1999 |
| | p4.depot.root | doc |
| | p4.depot.branch | prod |
| | helpdocs.build.dir | core/build |
| | P4_HOME | C:/Program Files/Perforce |
| | PERL_HOME | C:/Perl |

FIG. 5

METHOD AND SYSTEM FOR DOCUMENT INTEGRATION

CLAIM OF PRIORITY

This application claims the benefit of U.S. Provisional Patent Application 61/506,929, entitled SYSTEMS AND METHODS FOR DOCUMENT INTEGRATION, filed Jul. 12, 2011 the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to an automated process for integrating documents from a source document respository to a destination document respository that is located in a cloud environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Typically, documents generated by workers in an enterprise are checked-in or uploaded into the enterprise's internal document repository so that other internal employees can access and update the documents. Documents checked-in to the enterprise's internal document repository are typically created using a machine-readable format, such as eXtensible Markup Language (XML). In some cases, the documents are intended to educate or assist an external audience, i.e., users or readers external to the enterprise. For example, help documents are generated to explain or describe products for users who purchased or are interested in purchasing the products. When these documents are created, they too are XML formatted documents and typically checked into the enterprise's internal document repository. These documents are then transmitted to a destination document repository in a cloud environment that is accessible by the external audience through a web portal via a public network, such as the Internet.

Nevertheless, because the documents are XML formatted, they cannot be rendered "as is" by a web portal or web browser. In order to display the documents in the web portal or other human-readable form, the documents must be converted from XML to a human-readable format, such as eXtensible HyperText Markup Language (XHTML). Once converted, the document can be rendered by a web portal and presented to the external audience.

The process of converting the document from the machine-readable format, i.e., XML, to the web browser/web portal compatible format, i.e., XHTML, is a time consuming task. Typically, the conversion is performed by a human administrator responsible for such matters prior to transmitting the documents to the destination document repository. The administrator can retrieve a document from the source document repository and load it into a format converter module, which reformats the document into the desired format. The administrator can then manually identify certain information about the document from the reformatted document, such as the document's title, its creation date, and the author. This information can be used to define or describe the document for future reference. The administrator then typically transmits the converted document to the destination document repository, where it can be stored and accessible by the external audience via a web portal.

Without doubt, the process of integrating documents from the enterprise's document repository to the destination document repository in the cloud environment is a tedious and costly process because it must be monitored by at least one administrator. The task becomes even more daunting when the enterprise's document repository receives thousands of new and/or updated documents every day or week.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 5 illustrates a graphical user interface representing a configuration setup form according to an exemplary embodiment;

DETAILED DESCRIPTION

General Overview

Systems and methods are provided for integrating a document from a first document repository to another document repository in a cloud computing environment. According to exemplary embodiments, a document integration service is provided to automate the migration and conversion of documents from an enterprise document respository to a destination document respository in the cloud computing environment. In an embodiment, the document integration service is configured to receive a configuration setup file that includes information identifying a source document repository, the destination document repository and at least one web portal which has access to the documents in the destination document repository. Once configured, the service automatically retrieves documents from the source document repository, converts them from a first format to a second format, and transmits them to the destination document repository where they can be accessed by a user through the web portal(s). In this manner, the entire integration process is automated thereby allowing the administrator to attend to other matters.

In an embodiment, the document integration service can automatically extract metadata from the converted document based on keywords and/or specified tags, and can generate or update a metadata file that includes the extracted metadata from the current and other converted documents. The metadata file can be transmitted along with the converted document(s) to the destination document repository to be used as a reference for the document(s).

In another embodiment, the document integration service can automatically extract static objects from the converted document when such objects cannot or should not be stored in the destination document repository. For example, static objects can be images and video clips embedded in the converted document. In an embodiment, the document integration service can generate a mapping file that maps the static objects to the document from which they were extracted, and can then transmit the static objects and the mapping file to the web portal(s) designated in the configuration setup file. In this manner, the web portal can render the static objects in the document when displaying the document.

Figure 1:
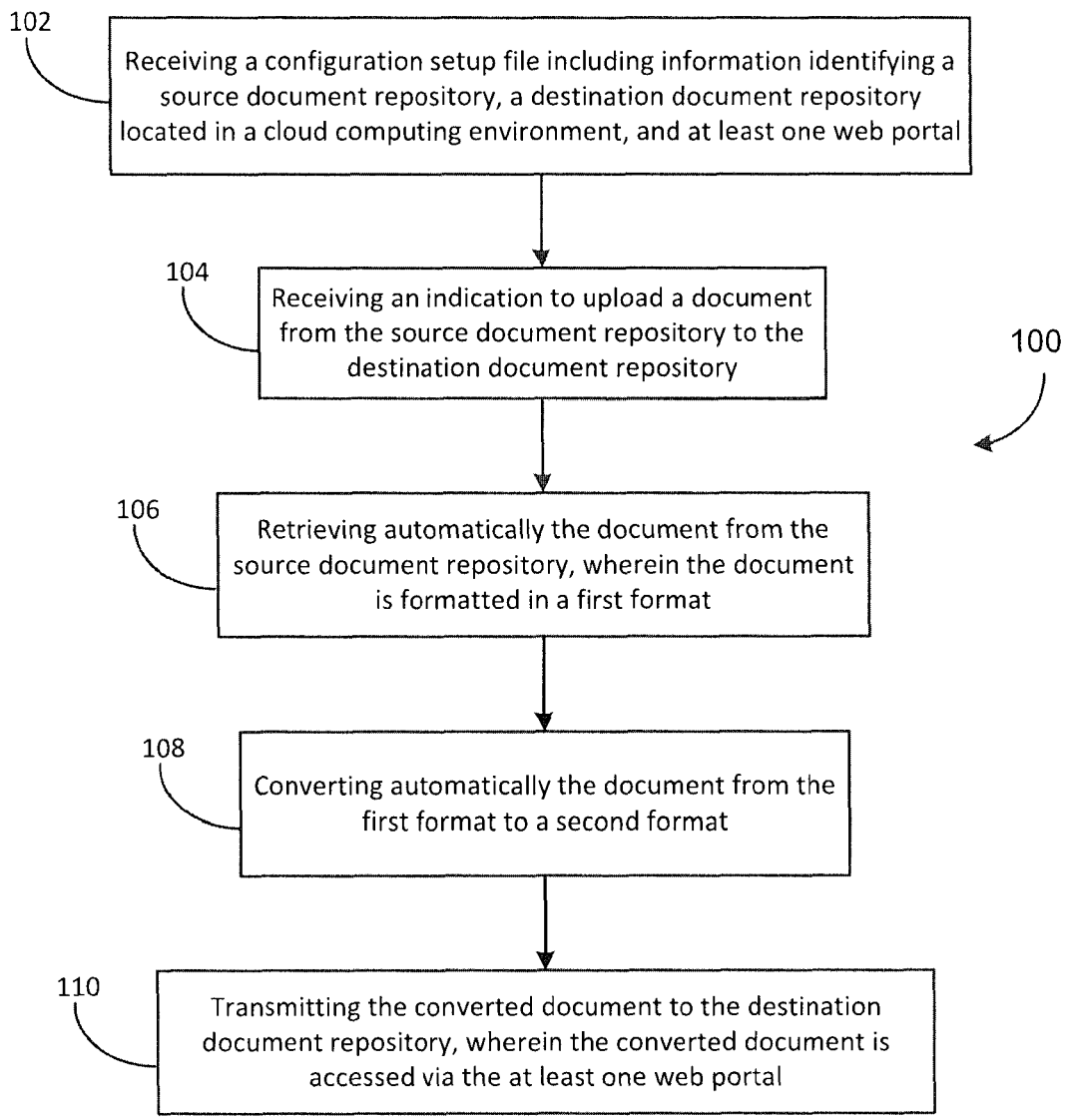
FIG. 1 is an operational flow diagram illustrating a high level overview of a technique for integrating a document from a first document repository to another document repository in a cloud computing environment according to an embodiment.
Figure 2:
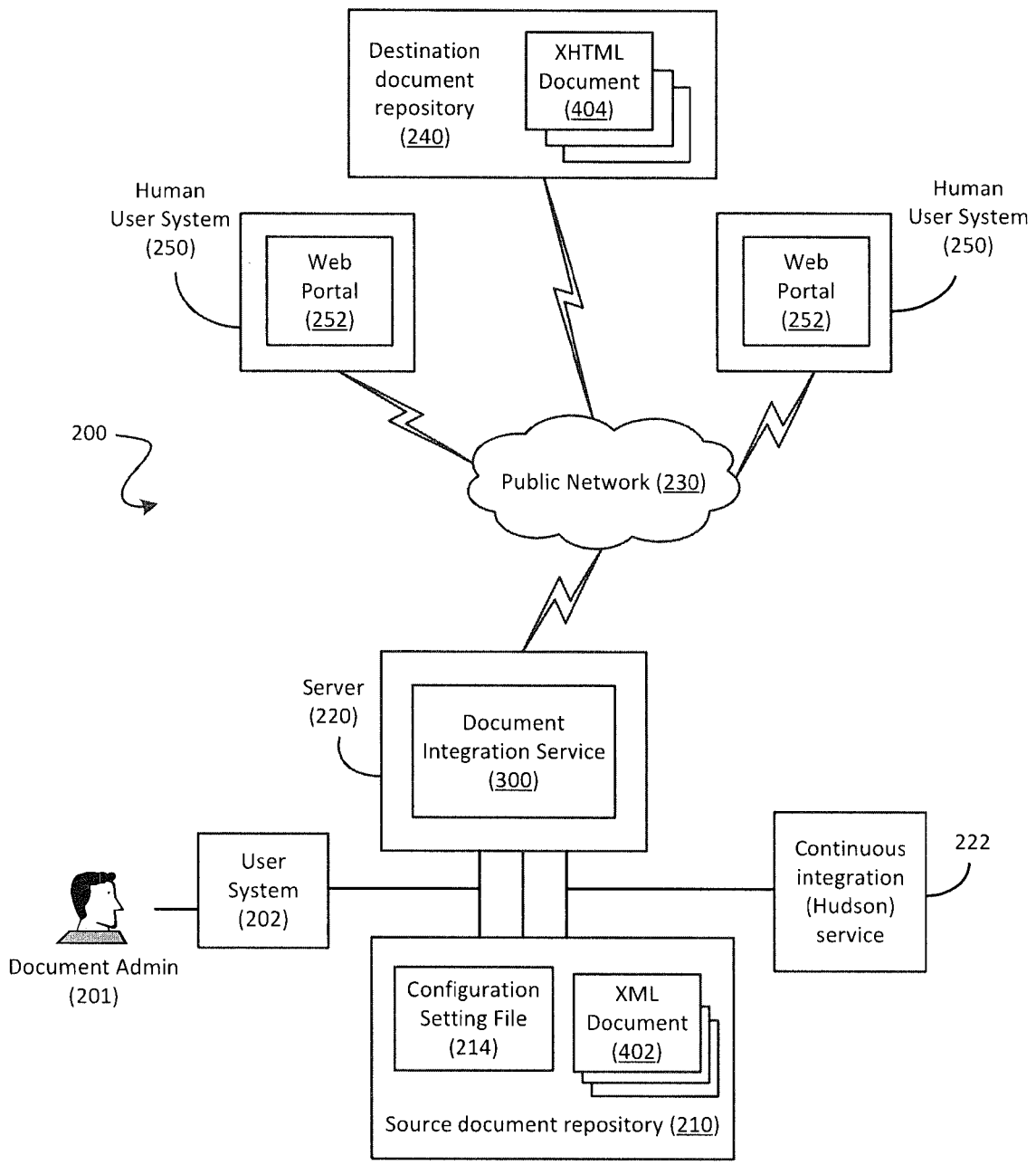
FIG. 2 illustrates a representative system for integrating a document from a first document repository to another document repository in a cloud computing environment according to an embodiment.
Figure 3:
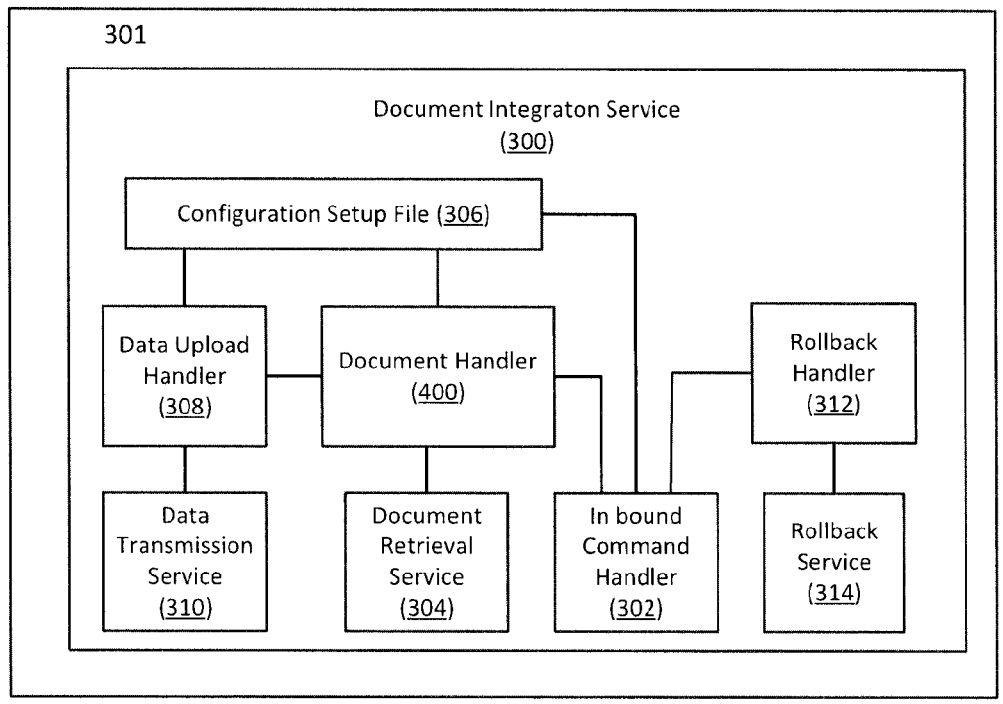
FIG. 3 is a representative system for integrating a document from a first document repository to another document repository in a cloud computing environment according to another embodiment.

Referring now to FIG. 1, a flow diagram is presented illustrating a method 100 for integrating a document from a first document repository to another document repository according to an embodiment. FIG. 2 illustrates a representative system 200 for integrating a document according to an embodiment, and FIG. 3 is a block diagram illustrating another exemplary system for integrating a document from a first document repository to another document repository. In particular, FIG. 3 illustrates an arrangement of components configured to implement the method 100 of FIG. 1, which also can be carried out in environments other than that illustrated in FIG. 3.

In FIG. 3, the components are configured to operate within an execution environment hosted by a computer device and/or multiple computer devices, as in a distributed execution environment. Exemplary computer devices can include desktop computers, servers, networking devices, notebook computers, PDAs, mobile phones, digital image capture devices, and the like. For example, FIG. 2 illustrates a plurality of computer devices 220, 240, 250 communicatively coupled to one another via a network 230, such as the Internet, where a server 220 can be configured to provide an execution environment configured to support the operation of the components illustrated in FIG. 3 and/or their analogs. One example of such a server 220 will be described later in greater detail during reference to later illustrated embodiments.

The server 220 is communicatively coupled to a source document repository 210 via a private network and/or a public network. In an embodiment, the source document repository 210 can be an enterprise database located in a secure network of the enterprise, which is generally protected from public/external access. The source document repository 210 can receive documents created by users via an internal user system 202, and can store the documents for internal or external distribution. In an embodiment, the source document repository 210 includes a centralized revision control system, such as that provided by Perforce Software, Inc., that manages multiple versions of documents.

The server 220 can be located within the secure enterprise network, or in a perimeter network, e.g., a de-militarized zone, associated with the enterprise. The server 220 is also communicatively coupled to a destination document repository 240 via a public network. In an embodiment, the destination document repository 240 can be a database system located in a cloud computing environment, and may be implemented as a multi-tenant database system in an embodiment. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

In an embodiment, the destination document repository 240 can be configured to receive and store documents from the server 220, and to provide documents to a human user system 250, e.g., a mobile handheld device or a laptop computer, via the network 230. The network 230 can be a local area network (LAN) or a wide area network (WAN), such as the Internet. In an embodiment, the documents stored in the destination document repository 240 can include help documents that are linked to other documents or that can be accessed through other documents. The human user system 250 may include an application that allows network communication between the human user system 250 and the destination document repository 240. Such an application can be, in an embodiment, a web portal 252 provided by a network browser (e.g., Chrome, Internet Explorer, Safari, etc.) or the like that is capable of sending and receiving information to and from the destination document repository 240.

FIG. 1, as stated above, illustrates a method for integrating a document from a first document repository to another document repository in a cloud computing environment. In this case, the method 100 can be implemented in the context of the server 220 hosting the document integration service 300, but can also be implemented in any desired environment. With reference to FIG. 1, the method 100 begins, in block 102, by receiving a configuration setup file by the server 220 hosting the document integration service 300. In an embodiment, the configuration setup file 306 includes information identifying a source document repository 210, a destination document repository 240 located in a cloud computing environment, and at least one web portal 252. The document integration service 300 includes means for receiving the configuration setup file 306. For example, FIG. 3 illustrates an inbound command handler 302 in the document integration service 300 configured to receive the configuration setup file 306.

In an embodiment, the configuration setup file 306 identifies, among other things, the source document repository 210 from which documents are to be retrieved and the destination document repository 240 to which the retrieved documents are to be uploaded. According to an embodiment, the configuration setup file 306 can be generated by an internal document administrator 201 and provided to the server 220 via the internal user system 202. In another embodiment, when the source document repository 210 is managed by a centralized revision control system, the document administrator 201 can check-in configuration settings 214 into the source document repository 210. A continuous integration service 222, such as Hudson, can be configured to poll the source document repository 210 for updates to the repository and to detect the checked-in configuration settings 214. Once an update is detected, the continuous integration service 222 can be configured to launch a configuration setup routine which can extract the configuration settings 214 from the source document repository 210 and can automatically generate the configuration setup file 306 based on the configuration settings 214.

FIG. 5 is a graphical user interface representing an exemplary configuration setup form that can be used by the document administrator 201 and/or the continuous integration service 222 to generate the configuration setup file 306 according to an embodiment. When the configuration setup routine is launched by either the document administrator 201 or by the continuous integration service 222, the setup form 500 can be presented to the document administrator 201 via the user system 202. The configuration setup form 500 collects information required to enable the document integration service 300 to integrate documents from the source document repository 210 to the destination document repository 240. For example, the form 500 includes fields for a URL prefix and hostname associated with the destination document repository 240; fields for the document administrator's login and password; fields for a URL, username and password associated with a web portal 252; and fields for identifying the source document repository 210. Although the form 500 shown in FIG. 5 identifies one web portal 252 and one source document repository 210, the form 500 can be expanded to identify more than one web portal 252 and more than one source document repository 210.

When the required information is collected and entered into the form 500, the configuration setup routine can be configured to generate the configuration setup file 306 and to transmit a message including the configuration setup file 306 to the document integration service 300 in the server 220 according to an exemplary embodiment. In an embodiment, the message can include a command associated with the configuration setup file 306. For example, when the document integration service 300 is being initialized, the command can be a "setup" command, while when the document integration service 300 is in operation, the command can be an "update" command.

The inbound command handler 302 in the document integration service 300 can be configured to receive the message including the configuration setup file 306 from the continuous integration service 222 or the user system 222, to execute the command associated with the message, and to store the configuration setup file 306 in the document integration service 300. At this point, the document integration service 300 is ready to integrate documents from the source document repository 210 to the destination document repository 240.

Referring again to FIG. 1, in block 104, an indication to upload a document from the source document repository 210 to the destination document repository 240 is received by the document integration service 300 hosted by the server 220. According to an embodiment, the inbound command handler 302 can be configured to receive the indication to upload a document from the source document repository 210 to the destination document repository 240. The indication can be received, in an embodiment, from the document administrator 201 via the user system 202 and/or from the continuous integration service 222. The document administrator 201 can, in an embodiment, manually issue the indication to upload the document whenever a new version of the document is released or when a new product is being released. Alternatively and/or in addition, the continuous integration service 222 can be programmed to send the indication to upload the document automatically on a periodic basis, e.g., every Monday morning at 2:00 am.

As noted above, the source document repository 210 can be a centralized revision control system that manages versions of documents 402. In this embodiment, the indication received by the server 220 can be to upload a set of documents that includes the document 402, where the set is associated with a version number and/or a release number. The document administrator 201 can manually issue the indication to upload the set when a new version of the set is released or when a new product is being released. For example, in an embodiment, the document administrator 201 can call an upload routine provided by the continuous integration service 222, provide the version/release number in a user interface, and then launch the routine. Alternatively and/or in addition, the continuous integration service 222 can be programmed to send the indication to upload the set automatically on a periodic basis.

Referring again to FIG. 1, in response to receiving the indication in block 104, the document, which is formatted in a first format, is automatically retrieved from the source document repository 210 in block 106. According to an embodiment, when the inbound command handler 302 receives the indication, it can be configured to route the indication to a document handler 400 in the document integration service 300.

In response to receiving the indication, the document handler 400 can be configured to access the configuration setup file 306 to determine the information required to retreive the document. For example, the document handler 400 can determine the username and password required to access the document 402 stored in the source document repository 210. Once the required information is determined, the document handler 400 can, in an embodiment, invoke a document retrieval service 304 in the document integration service 300 that automatically retrieves the document 402 from the source document repository 210 using the configuration setup information. Once retrieved by the retrieval service 304, the document 402 can be provided to the document handler 400.

As noted above, the document 402 can be included in a set of documents and the set can be associated with a version and/or release number. In this case, the document handler 400 can instruct the document retrieval service 304 to retrieve the set of documents associated with the version/release number. Once retrieved, the set of documents including the document 402 can be temporarily stored by the document retrieval service 304, and the document 402 can be provided to the document handler 400.

As noted above, the document 402 is typically formatted at creation using a machine-readable format, such as XML, because it is generated internally by an organization associated with the source document repository 210. As is, the document 402 cannot be presented to an external user through the web portal 252. In order for the document 402 to be rendered by a web browser or the web portal 252, it must be reformatted into a format that is compatible with the web portal 252. For example, a format compatible with the web portal 252 can be XHTML.

Referring again to FIG. 1, in block 108, the retrieved document 402 is converted automatically from the first format, e.g., XML, to a second format, e.g., XHTML. In an embodiment, the document handler 400 is configured to receive the document 402 and to automatically convert it from its original (first) machine-readable format to the second web portal compatible format.

Figure 4:
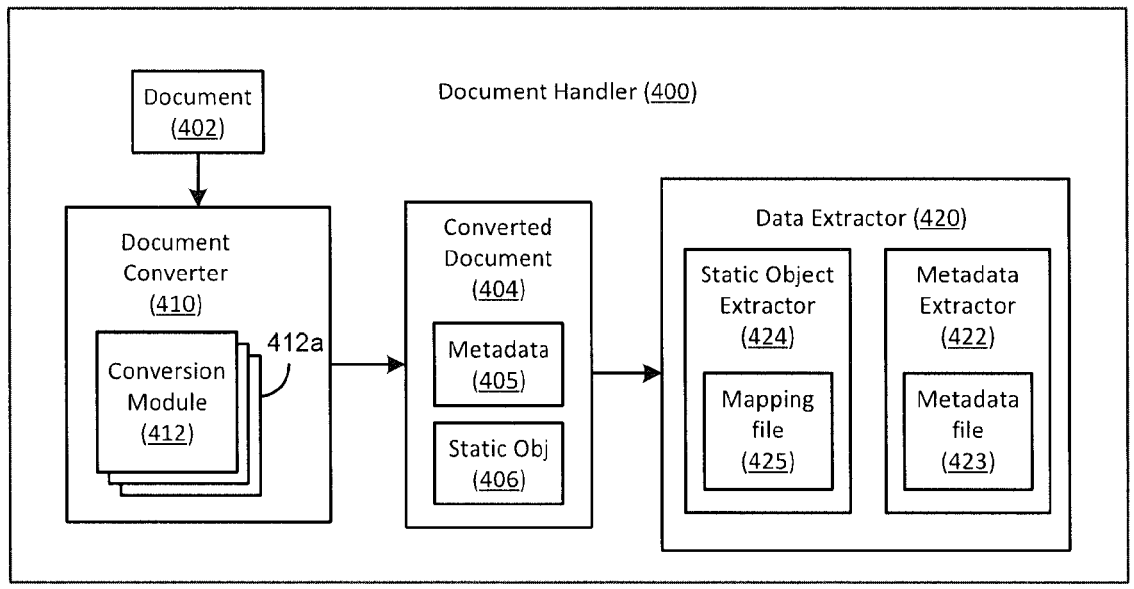
FIG. 4 is a block diagram representing an exemplary system for converting a document from a first format to a second format according to an embodiment.

FIG. 4 is a block diagram representing an exemplary document handler 400 according to an embodiment. As shown, the document handler 400 includes a document converter 410 that is configured to generate a converted document 404 from the document 402. In an embodiment, the document converter 410 includes a conversion module 412, which is configured to reformat documents in the first format to a second format associated with the conversion module 412. In an embodiment, the document converter 410 is configured to receive the document 402 and to invoice the conversion module 412 to transform the document 402 in the first format to the converted document 404 in the second format.

According to an embodiment, the document converter 410 can include a plurality of conversion modules 412 where each of the conversion modules 412 can be associated with a different second document format. For example, a first conversion module 412 can be associated with XHTML and a second conversion module 412a can be associated with HTML or some other second format. In an embodiment, the conversion modules 412 can be plug-in modules that can be installed dynamically by the document handler 400. In this embodiment, each conversion module 412, 412a can be configured to reformat a document in the first format to a second format associated with the conversion module 412, 412a. For example, the configuration setup file 306 can include information identifying a particular second format to which the document 402 is to be converted, and the document converter 410 can be configured to select a conversion module, e.g., 412a, from the plurality of modules 412, 412a based on the configuration information. Once selected, the conversion module 412a can be invoked to convert the document 404 into the format associated with the selected conversion module 412a.

Referring again to FIG. 1, after the converted document 404 is generated, it can be transmitted to the destination document repository 240, in block 110, where the converted document 404 can be accessible via the at least one web portal 252. According to an embodiment, the document integration service 300 can include a data upload handler 308 configured to transmit the converted document 404 to the destination document repository 240. For example, when the converted document 404 is received, the data upload handler 308 can be configured to access configuration information in the configuration setup file 306 to determine the destination document repository 240 and any information required to transmit the converted document 404 thereto. For example, the data upload handler 308 can determine the URL prefix, hostname, and login and password associated with the destination document repository 240 from the configuration setup file 306. Once the destination document repository 240 and required information is determined, the data upload handler 308 can generate a package, e.g., a zip file, including the converted document 404 and can invoke a data transmission service 310 in the document integration service 300 to send the package to the destination document repository 240 over the network 230.

As noted above, the document 402 can be included in a set of documents from the source document repository 210. In an embodiment, the converted document 404 in the set can be transmitted immediately. In another embodiment, the converted document 404 can be temporarily stored in an upload file (not shown) by the data upload handler 308. When another document in the set is converted, it can be added to the upload file. In this embodiment, the data upload handler 308 can be configured to convert the upload file into the package so that more than one converted document 404 can be transmitted to the destination document repository 240 in a single package. For example, when a certain condition is satisfied, e.g., a storage capacity of the upload file is reached or all documents in the set have been converted, the data upload handler 308 can compress the upload file, generate a package including the compressed upload file, and invoke the data transmission service 310 to send the package to the destination document repository 240 over the network 230.

As noted above, the destination document repository 240 is located in a cloud computing environment, and can be accessed by a user via a web portal 252 in a user system 250 over a public network 230, such as the Internet. Once the converted document 404 is received and stored by the destination document repository 240, the user can submit a request to access the document 404 to the destination document repository 240 via the web portal 252. In response, the destination document repository 240 can retrieve and return the requested document 404 to the web portal 252. Because the document 404 is formatted in a language compatible with the web portal 252, the document 404 can be rendered and presented to the user.

According to an exemplary embodiment, the document handler 300 can provide additional features. For example, once the converted document 404 is generated, the document handler 400 can be configured to identify and extract metadata 405 associated with the document 404. The document handler 400 can include, in an embodiment, a data extractor 420 configured to parse the converted document 404. A metadata extractor 422 in the data extractor 420 can be configured to identify and extract specified metadata 405 from the parsed document. For example, in an embodiment, the specified metadata 405 can include information identifying the document, e.g., a title, a document type or category, a summary of the document, an author, a creation date, and/or other metadata describing the document 404.

The metadata extractor 422 can also be configured to generate one or more metadata files 423 including the extracted metadata 405. In an embodiment, the metadata file 423 can be a comma separated value (.csv) type-file where the extracted metadata 405 for the document 404 is presented in a row of comma separated values. When the document 404 is included in a set of documents, the metadata file 423 can include a plurality of rows, where each row includes the extracted metadata 405 from each document in the set of documents. According to an embodiment, the metadata file 423 for the document 404 and/or for the set of documents can be provided to the data upload handler 308, which can include the metadata file 423 in the package along with the converted document(s) 404. When the data transmission service 310 is invoked, the metadata file(s) 423 and converted document(s) 404 can be sent to the destination document repository 240 over the network 230. At the destination document repository 240, the metadata file 423 can be used in various ways to manage and/or process the documents 404. For example, the metadata file 423 can be parsed and used to index the documents 404 for searching and retrieval.

According to another exemplary embodiment, once the converted document 404 is generated and parsed, the document handler 400 can also be configured to identify and extract at least one static object 406 in the converted document 404. Exemplary static objects 406 can include multimedia files, e.g., images, video clips and audio clips, a glossary, an index, and a table of contents. A static object extractor 424 in the data extractor 420 can be configured to identify and extract the static objects 406 in the parsed converted document 404.

In an embodiment, once extracted, the static objects 406 can be provided to the data upload handler 308, which can be configured to transmit them to at least one web portal 252. For example, when the static objects 406 in the converted document 404 are received by the data upload handler 308, it can be configured to access configuration information in the configuration setup file 306 to determine at least one web portal 252 and any information required to transmit the static objects 406 thereto. In an embodiment, the data upload handler 308 can determine the URL, login name and password associated with at least one web portal 252 from the configuration setup file 306. Once the web portal 252 and required information are determined, the data upload handler 308 can generate a package, e.g., a zip file, including the static objects 406 and can invoke the data transmission service 310 to send the package to the web portal 252 over the network 230. Accordingly, when the converted document 404 is accessed via the web portal 252, the document and its static objects 406 can be rendered for presentation to the user.

Alternatively or in addition, after identifying and extracting the static objects 406 in the converted document 404, the static object extractor 424 can be configured to generate a static object mapping file 425 associated with the converted document 404 that maps the static objects 406 to the document 404 and/or to a location in the document 404. For example, each static object 406 in the converted document 404 can be associated with an identifier, and the static object mapping file 425 can include information identifying the document 404, e.g., the document title, the identifier of the static object 406, and/or a link to the location of the static object 406 in the document 404.

According to an embodiment, the static object mapping file 425 can be provided to the data upload handler 308, which can include the static object mapping file 425 in the package along with the static objects 406. When the data transmission service 310 is invoked, the static object mapping file 425 and static objects 406 can be sent to the web portal(s) 252 over the network 230. The web portal 252 can be configured to receive and store the static objects 406 and static object mapping file 425 so that when the document 404 is retrieved from the destination document repository 240 and rendered by the web portal 252, the static object mapping file 425 can be used to identify the static objects 406 associated with the document 404 and can be used to render them in their correct locations in the document 404. By sending the static objects 406 and/or static object mapping file 425 to the web portal 252, storage space in the destination document repository 240 can be reserved for document content.

According to another embodiment, the destination document repository 240 can be configured to store more than one version of a document or set of documents. For example, the destination document repository 240 can store the three most recent versions of a document or set of documents, and each document or set can be associated with a different version/release number. In this embodiment, when the retrieved document 402 is a most recent version of a document 404 already stored in the destination document repository 240, the data upload handler 308 in the document integration service 300 can be configured to identify an obsolete version of the document stored in the destination document repository 240. In an embodiment, an obsolete version of a document can be determined based on an upload date, and/or the version/release number. For example, when the destination document repository 240 is configured to store the three most recent versions of a document, the fourth most recent version of the document is obsolete.

Once the obsolete version of the document or set is identified, the data upload handler component 308 can generate a message including a command to remove the obsolete version of the document (or set of documents) from the destination document repository 240. In an embodiment, the command can include the version/release number associated with the obsolete version of the document or set. When the data transmission service 310 is invoked, the message can be sent to the destination document repository 240 over the network 230. At the destination document repository 240, the obsolete version of the document or set can be removed, and in an embodiment, archived in another repository (not shown) or destroyed.

In addition, the data upload handler component 308 can generate another message including a command to remove the static objects 406 and/or static object mapping file 425 associated with the obsolete version of the document (or set of documents) from the web portal 252. When the data transmission service 310 is invoked, the other message can be sent to the web portal 252 over the network 230. At the web portal 252, the static objects 406 and/or static object mapping file 425 associated with obsolete version of the document or set can be removed, and in an embodiment, archived in another repository (not shown) or destroyed.

In yet another embodiment, the document integration service can be configured to receive an indication to rollback the document 404 or set of documents from the destination document repository 240. Such an indication can be received from the document administrator 201 via the user system 202 and/or by the continuous integration service 222 when the document(s) 402 has been mistakenly uploaded, e.g., prior to the release date of a product.

According to an embodiment, the indication to rollback the document 404 can be received by the inbound command handler 302 and routed to a rollback handler 312 in the document integration service 300. The rollback handler 312 can be configured to generate a first message including a command to remove the document 404 (or set of documents) from the destination document repository 240. In an embodiment, the command can include the version/release number associated with the document or set. In addition, the rollback handler 312 can generate a second message including a command to remove the static objects 406 associated with the document(s) 404 from the web portal(s) 252. A rollback service 314 in the document integration service 300 can be invoked to transmit the first message to the destination document repository 240 and to transmit the second message to the web portal(s) 252 over the network 230. When the first message is received by the destination document repository 240, the document 404 or set can be removed, and when the second message is recieved by the web portal(s) 252, the static objects 406 associated with the document 404 are removed.

System Overview

Figure 6:
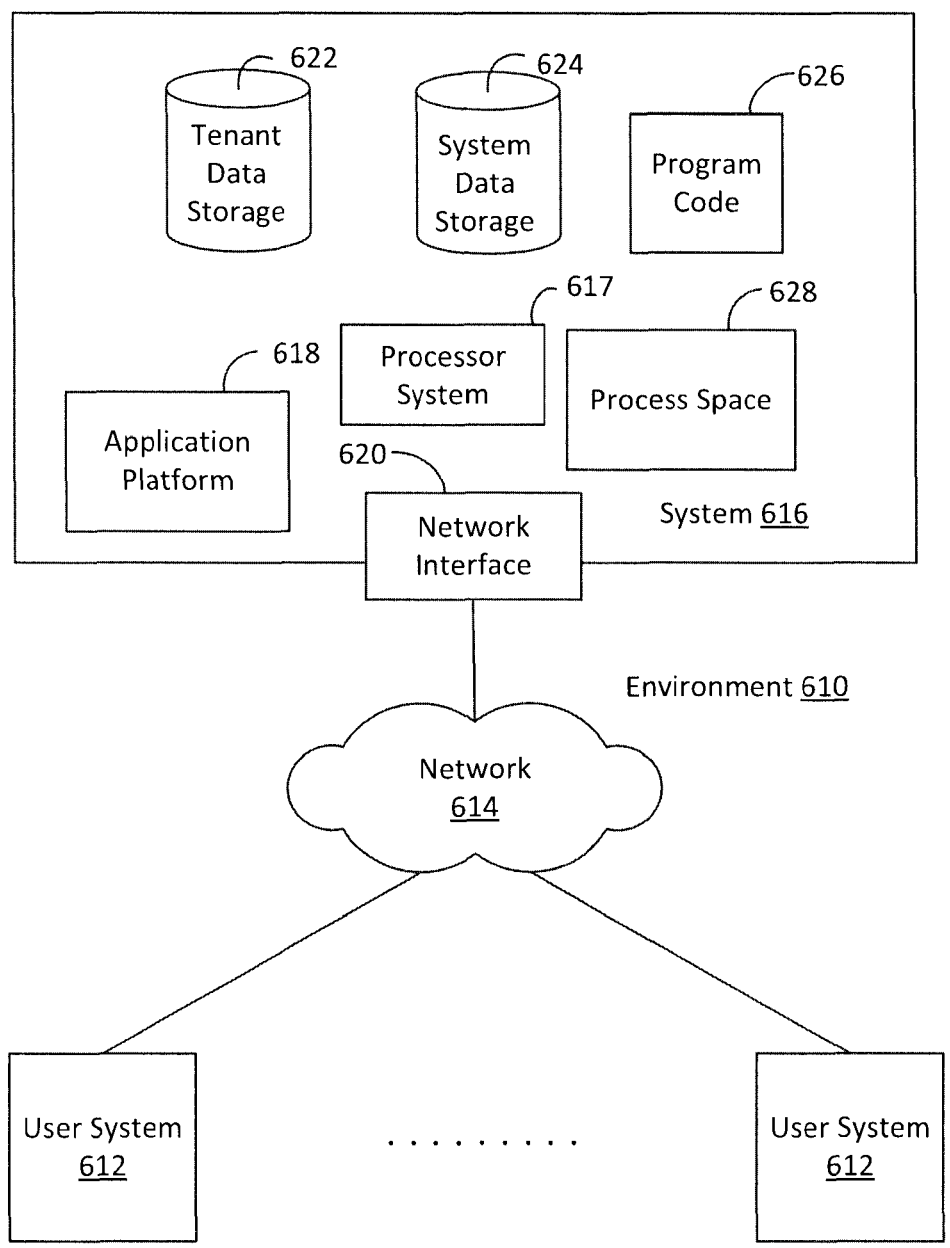
FIG. 6 illustrates a block diagram of an example of an environment wherein an on-demand database service might be used.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
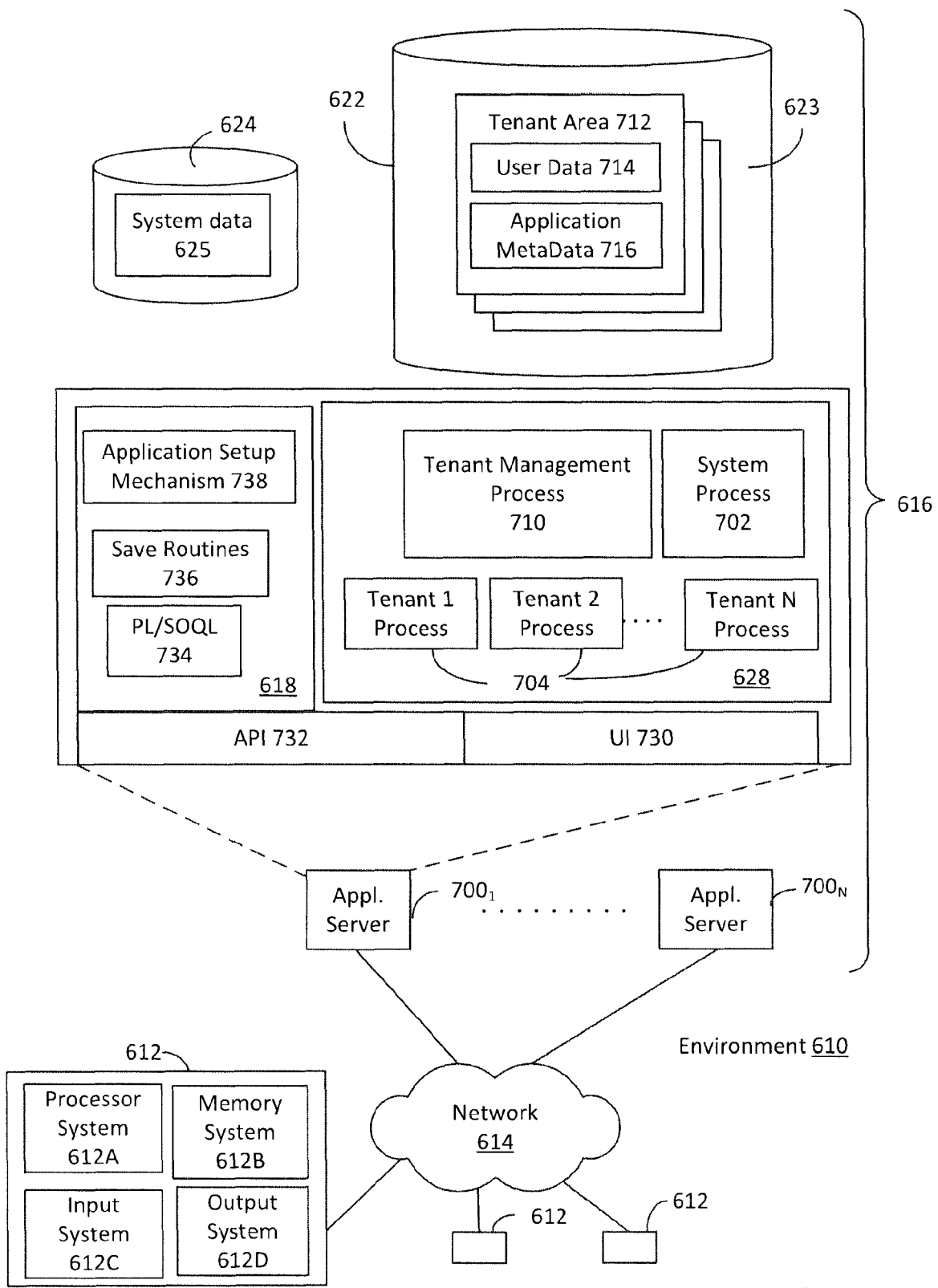
FIG. 7 illustrates a block diagram of an embodiment of elements of FIG. 6 and various possible interconnections between these elements.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user data storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers $700_1$-$700_N$, an application platform 618, tenant data storage 622, and system data storage 624. Also shown is system process space 702, including individual tenant process spaces 704 and a tenant management process space 710. Each application server $700_1$-$700_N$ may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user data storage 714 and application metadata 716 might be similarly allocated for each user. For example, a copy of a user's most recently used (MRU) items might be stored to user data storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data 623 and the system data 625 may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 716 for the subscriber making the invocation and executing the metadata as an application in a virtual machine.

Each application server $700_1$-$700_N$ may be communicably coupled to database systems, e.g., having access to system data 625 and tenant data 623, via a different network connection. For example, one application server 700*i* might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers $700_1$-$700_N$ and the database system. However, it will be apparent to one skilled in the art that other transport protocols may be used to optimize the system depending on the network interconnect used.

In certain embodiments, each application server $700_1$-$700_N$ is configured to handle requests for any user associated with any organization that is a tenant. Because it is desirable to be able to add and remove application servers from the server pool at any time for any reason, there is preferably no server affinity for a user and/or organization to a specific application server $700_1$-$700_N$. In one embodiment, therefore, an interface system implementing a load balancing function (e.g., an F5 Big-IP load balancer) is communicably coupled between the application servers $700_1$-$700_N$ and the user systems 612 to distribute requests to the application servers $700_1$-$700_N$. In one embodiment, the load balancer uses a least connections algorithm to route user requests to the application servers $700_1$-$700_N$. Other examples of load balancing algorithms, such as round robin and observed response time, also can be used. For example, in certain embodiments, three consecutive requests from the same user could hit three different application servers $700_1$-$700_N$, and three requests from different users could hit the same application server $700_1$-$700_N$. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers $700_1$-$700_N$ to request and update system-level and tenant-level data from system 616 that may require sending one or more queries to tenant data storage 622 and/or system data storage 624. System 616 (e.g., an application server $700_1$ in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations and techniques have been described with reference to an embodiment in which techniques for providing machine status information in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for integrating a document from a first document repository to another document repository in a cloud computing environment, the method comprising:
    receiving by a server a configuration setup file including information identifying a source document repository, a destination document repository located in a cloud computing environment, and at least one web portal;
    receiving by the server an indication to upload a document from the source document repository to the destination document repository;
    in response to receiving the indication, retrieving automatically by the server the document from the source document repository, wherein the document is formatted in a first format;
    converting automatically by the server the document from the first format to a second format;
    identifying automatically by the server at least one static object in the converted document;
    transmitting the at least one static object associated with the converted document to the at least one web portal;
    transmitting the converted document to the destination document repository, the converted document being accessible via the at least one web portal;
    removing, from the destination document repository, an obsolete version of the document from the destination document repository; and
    removing, from the at least one web portal, a static object associated with the obsolete version of the document.

2. The method of claim 1 wherein receiving the configuration set up file comprises receiving the configuration setup file from a continuous integration service configured to poll the source document repository for updates to a configuration setting.

3. The method of claim 1 wherein the destination document repository is included in a multi-tenant on-demand database system.

4. The method of claim 1 wherein the indication to upload the document from the source document repository is received at least one of automatically on a periodic basis and manually from a document administrator.

5. The method of claim 1 wherein the first format is a machine-readable format and the second format is compatible with the at least one web portal.

6. The method of claim 1 wherein first format is eXtensible Markup Language (XML) and the second format is eXtensible HyperText Markup Language (XHTML).

7. The method of claim 1 further comprising providing by the server a plurality of conversion modules associated with a plurality of formats, wherein each conversion module is configured to convert the document from the first format to the format associated with the conversion module.

8. The method of claim 7 wherein the configuration setup file further includes information identifying the second format and wherein converting the document includes automatically selecting from the plurality of conversion modules a conversion module associated with the second format based on the configuration information, and invoking the selected conversion module to convert the document from the first format to the second format.

9. The method of claim 1 further comprising after converting the document from the first format to the second format, automatically identifying and extracting metadata associated with the document.

10. The method of claim 9 further comprising:
    generating at least one metadata file including the extracted metadata, wherein the at least one metadata file includes metadata identifying the document, and at least one of metadata indicating a document type, metadata summarizing the document, and metadata indicating an author and a creation date; and
    transmitting the at least one metadata file and the converted document to the destination document repository.

11. The method of claim 10 wherein the at least one metadata file is a comma separated value type-file.

12. The method of claim 1 wherein the at least one static object associated with the converted document is rendered in the converted document when the converted document is accessed via the at least one web portal, the at least one static object including at least one of a multi media file, a glossary, an index and a table of contents.

13. The method of claim 12 wherein the at least one static object is associated with an identifier and the method further comprises generating a static object mapping file associated with the document that maps the identifier of the at least one static object to at least one of the document and a location in the document and transmitting the static object mapping file to the at least one web portal.

14. The method of claim 12 further comprising:
    receiving by the server an indication to rollback the document from the destination document repository;
    removing the document from the destination document repository; and
    removing the at least one static object associated with the document from the at least one web portal.

15. The method of claim 1 wherein the document from the source document repository is included in a set of documents associated with at least one of a version number and a release number, and the source document repository is a revision control system.

16. The method of claim 15 wherein the destination document repository is configured to store a plurality of sets of documents, wherein each set is associated with at least one of a different version number and a different release number.

17. The method of claim 1 wherein the document retrieved from the source document repository is a most recent version of a document already stored in the destination document repository, the method further comprising:
    identifying automatically by the server an obsolete version of the document already stored in the destination document repository based on at least one of an upload date, a version number, and a release number; and
    removing the obsolete version of the document from the destination document repository.

18. The method of claim 1 wherein the document retrieved from the source document repository is a most recent version of a document already stored in the destination document repository, the method further comprising:
    identifying automatically by the server the obsolete version of the document already stored in the destination document repository based on at least one of an upload date, a version number, and a release number; and
    identifying automatically by the server the at least one static object associated with the obsolete version of the document based on at least one of the upload date, the version number and the release number.

19. A non-transitory tangible machine-readable medium carrying one or more sequences of instructions for integrating a document from a first document repository to another document repository in a cloud computing environment, which instructions, when executed by one or more processors, cause the one or more processors to carry out the steps of:
    receiving by a server a configuration setup file including information identifying a source document repository, a destination document repository located in a cloud computing environment, and at least one web portal;
    receiving by the server an indication to upload a document from the source document repository to the destination document repository;
    in response to receiving the indication, retrieving automatically by the server the document from the source document repository, wherein the document is formatted in a first format;
    converting automatically by the server the document from the first format to a second format;
    identifying automatically by the server at least one static object in the converted document;
    transmitting the at least one static object associated with the converted document to the at least one web portal;
    transmitting the converted document to the destination document repository, the converted document being accessible via the at least one web portal;
    removing, from the destination document repository, an obsolete version of the document from the destination document repository; and
    removing, from the at least one web portal, a static object associated with the obsolete version of the document.

20. An apparatus for providing machine status information via an enterprise social network, the apparatus comprising:
    a processor; and
    one or more stored sequences of instructions which, when executed by the processor, cause the processor to carry out the steps of:
    receiving by a server a configuration setup file including information identifying a source document repository, a destination document repository located in a cloud computing environment, and at least one web portal;
    receiving by the server an indication to upload a document from the source document repository to the destination document repository;
    in response to receiving the indication, retrieving automatically by the server the document from the source document repository, wherein the document is formatted in a first format;
    converting automatically by the server the document from the first format to a second format;
    identifying automatically by the server at least one static object in the converted document;
    transmitting the at least one static object associated with the converted document to the at least one web portal;
    transmitting the converted document to the destination document repository, the converted document being accessible via the at least one web portal;
    removing, from the destination document repository, an obsolete version of the document from the destination document repository; and
    removing, from the at least one web portal, a static object associated with the obsolete version of the document.

21. A method for transmitting code for providing machine status information via an enterprise social network on a transmission medium, the method comprising:
    transmitting code to receive by a server a configuration setup file including information identifying a source document repository, a destination document repository located in a cloud computing environment, and at least one web portal;
    transmitting code to receive by the server an indication to upload a document from the source document repository to the destination document repository;
    transmitting code to retrieve automatically by the server, in response to receiving the indication to upload the document, the document from the source document repository, wherein the document is formatted in a first format;
    transmitting code to convert automatically by the server the document from the first format to a second format;
    transmitting code to identify automatically by the server at least one static object in the converted document;
    transmitting code to transmit the at least one static object associated with the converted document to the at least one web portal;
    transmitting code to transmit the converted document to the destination document repository, the converted document being accessible via the at least one web portal;
    transmitting code to remove, from the destination document repository, an obsolete version of the document from the destination document repository; and
    transmitting code to remove, from the at least one web portal, a static object associated with the obsolete version of the document.

* * * * *